United States Patent
Ruiz (10) Patent No.: US 10,135,872 B2
(45) Date of Patent: Nov. 20, 2018

(54) SYSTEM AND METHOD FOR CONTEXT AWARE MOBILE POLICIES

(71) Applicants: Kabushiki Kaisha Toshiba, Minato-ku (JP); Toshiba TEC Kabushiki Kaisha, Shinagawa-ku (JP)

(72) Inventor: Adiel O. Ruiz, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 182 days.

(21) Appl. No.: 15/192,041

(22) Filed: Jun. 24, 2016

(65) Prior Publication Data

US 2017/0374100 A1 Dec. 28, 2017

(51) Int. Cl.
*H04L 29/06* (2006.01)
*H04W 12/08* (2009.01)
*H04N 1/32* (2006.01)
*H04W 4/80* (2018.01)

(52) U.S. Cl.
CPC .............. *H04L 63/20* (2013.01); *H04N 1/32* (2013.01); *H04W 4/80* (2018.02); *H04W 12/08* (2013.01); *H04N 2201/0053* (2013.01); *H04N 2201/0055* (2013.01); *H04N 2201/0094* (2013.01)

(58) Field of Classification Search
CPC ..... H04L 63/20; H04L 63/0876; H04L 63/10; H04N 1/32; H04N 2201/0055; H04N 2201/0053; H04N 2201/0094; H04W 12/08; H04W 4/80
See application file for complete search history.

(56) References Cited

U.S. PATENT DOCUMENTS

| | | | | |
|---|---|---|---|---|
| 2005/0148326 A1* | 7/2005 | Nogawa | H04L 41/0806 | 455/420 |
| 2009/0325566 A1* | 12/2009 | Bell | H04W 48/04 | 455/419 |
| 2010/0066486 A1* | 3/2010 | Park | G06F 21/305 | 340/5.3 |
| 2011/0055891 A1* | 3/2011 | Rice | G06F 21/88 | 726/2 |
| 2014/0282860 A1* | 9/2014 | Efrati | H04W 12/08 | 726/1 |
| 2015/0281276 A1* | 10/2015 | U | H04L 63/20 | 726/1 |
| 2015/0358822 A1* | 12/2015 | Hendrick | G06F 21/629 | 726/1 |
| 2017/0374509 A1* | 12/2017 | Smith | H04W 12/08 | |

\* cited by examiner

*Primary Examiner* — Matthew Smithers
(74) *Attorney, Agent, or Firm* — Ulmer & Berne LLP (57) ABSTRACT

A system and method for network policy enforcement for portable data devices such as smartphones, tablets or notebook computers uses the portable device to self-enforce prescribed policies. A beacon generator generates a wireless security beacon in accordance with an output of the beacon generator and a wireless data interface receives an access request from a portable data device. Digital security policy data configured to enable a preselected set of functions on the portable data device is stored in the data storage. The processor communicates the policy data to the portable data device in accordance with a received access request via the wireless data interface.

20 Claims, 7 Drawing Sheets

SYSTEM AND METHOD FOR CONTEXT AWARE MOBILE POLICIES

TECHNICAL FIELD

This application relates generally to controlled access to network functions for portable data processing devices. The application relates more specifically to recognition of networks relative to portable devices so as to facilitate controlled device access in accordance with network policy.

BACKGROUND

Data processing devices are ubiquitous and come in many different varieties, including servers, workstations, notebook computers, tablet computers and smartphones. Data interchange between or among devices may be via a device-to-device connection, such as by any wired or wireless data communication system. Examples of direct, device-to-device connections include tethering, such as with a universal serial bus (USB), FireWire, Lightning, or other suitable connection. Data connection between devices may also be established via a wireless communication system, including radio frequency, such as near field communication (NFC) or Bluetooth, optical, such as laser or infrared or even acoustic coupling. Data networks are frequently employed for data interchange. Networks include local area networks, such as a connection for a company or a premises, or wide area networks, such as connections between different buildings or geographic areas, with the global Internet forming the largest, publicly accessible network. Networks are also used to provide connections to network assets.

Network assets include document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used. Users may send document processing jobs, such as a print request, to one or more networked devices.

SUMMARY

In accordance with an example embodiment of the subject application, a system and method for policy enforcement includes a processor and associated data storage. A beacon generator generates a wireless security beacon in accordance with an output of the beacon generator and a wireless data interface receives an access request from a portable data device. Digital security policy data configured to enable a preselected set of functions on the portable data device is stored in the data storage. The processor communicates the policy data to the portable data device in accordance with a received access request via the wireless data interface.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Access to or functionality of network assets may be constrained in accordance with a particular devices or users. For example, authorized devices may be granted access to a network. Authorization may be established by prompting a user or device for login information prior to enabling network resources. Authentication can also be made by device information, such as a MAC address of a device's network adapter.

Controlled network access to devices provides for network security, as well as limiting access to network assets that may be use constrained, expensive to operate or contain sensitive information. Often times network access, network device accessibility or network device functionality is subject to administrative control. Mobile devices may be continually introduced to a network. It may be impractical to set accessibility constraints for each device or user that seeks a network connection. A solution includes dissemination of network policies which control a device's network functionality. Policies can be for individual users, individual devise or classes of user or devices.

Network policies are sets of conditions, constraints, and settings that allow a network administrator to designate who is authorized to connect to the network and the circumstances under which they can or cannot connect. By way of example, a Network Access Protection (NAP) policy may be added to a network policy configuration so that a Network Policy Server (NPS) or Mobile Device Management Server (MDMS) performs an authorization process.

Network policies can be viewed as rules wherein each rule has a set of conditions and settings. An NPS compares the conditions of the rule to the properties of connection requests. If a match occurs between the rule and the connection request, the settings defined in the rule are applied to the connection. When multiple network policies are configured in the NPS, they are an ordered set of rules; the NPS suitably checks each connection request against the first rule in the list, then the second, and so on, until a match is found. This is suitably accomplished via a routing and remote access service, such as used in connection with Microsoft network environments.

For devices, such as employee devices, network policies can be preset or preprogrammed. However, when unknown devices, such as guest user devices, seek network access, the device must be configured relative to acceptable network policy. This extra configuration may require the device to be connected to a policy server, or it may require an application to be installed on a device. These steps can be intrusive or not sufficiently user friendly for unsophisticated users. Thus, an administrator may be required to complete policy installation, resulting in lost efficiency, lost productivity and human resource cost.

Example embodiments herein realize faster and more effective integration of policies wherein a mobile user is prompted for acceptance relative to a network policy once network access is attempted or once their device is within a detectable network area. Policy acceptance is suitably accompanied by notice as to controls associated with policy acceptance which may be accepted, policy data is suitably downloaded into the user device which then acts as its own policy server. Policies are also suitably implemented to control functionality of a user device as a condition of usage. By way of further example, and as will be detailed below, suitable polices include areas such as preventing a contractor from taking pictures of a prototype product, prevent employees from using unsafe applications while connected to a business network, or mitigate unknown security risks. Enforcement of the usage policies can take place without the use of a remote server or third party application. Once a user is finished with a policy-controlled resource or the device is no longer in a policy controlled area, the device suitably returns to its original state.

Figure 1:
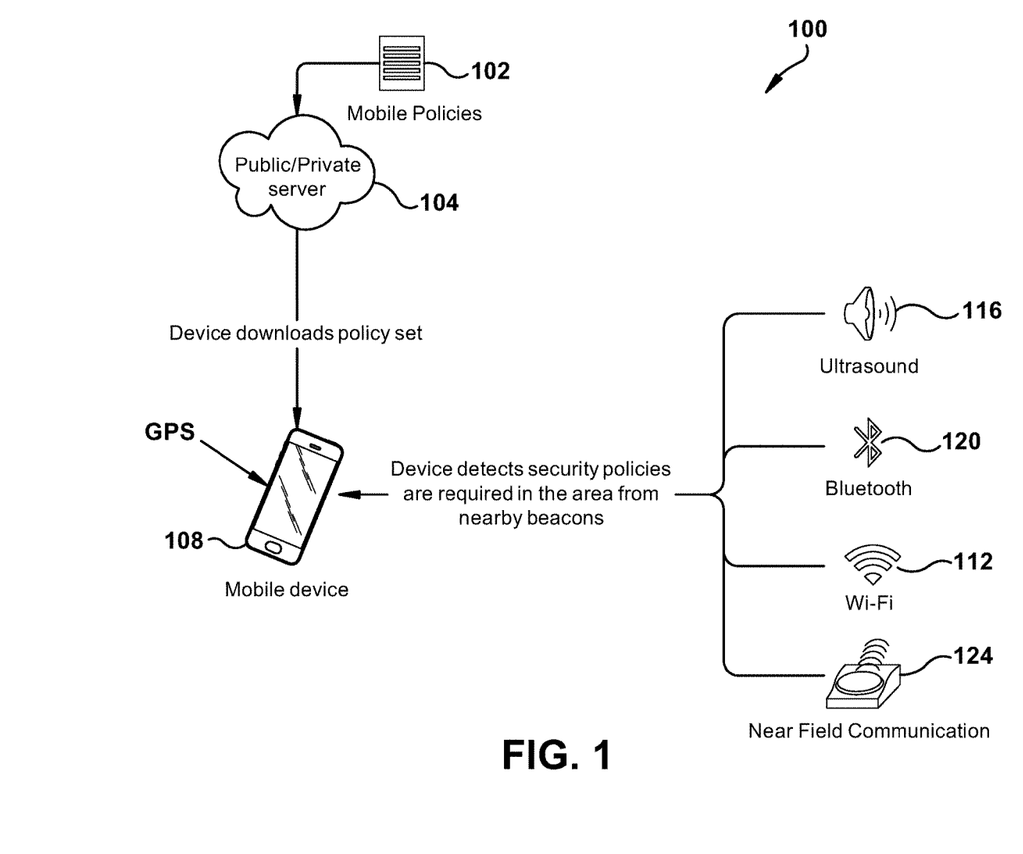
FIG. 1 an example embodiment of a network policy system.

In accordance with the subject application, FIG. 1 illustrates an example embodiment of a network policy system 100 including one or more networks 104 associated with one or more public or private servers. Policies, such as mobile policy 102 are suitably stored or routed thereby. A mobile device 108, such as a notebook computer, smart phone or tablet computer, enters a policy controlled area. The mobile device 108 may detect a network presence, such as a WiFi hotspot 112. Detection is also suitably made via any wireless or proximity-based detection system, including acoustically, such as via ultrasound 116, Bluetooth 120 or NFC 124. In addition to network detection, device or network detection is suitably accomplished by a mobile device 108 responding to a beacon from one or more wireless devices associated with the network. A policy is suitably obtained via the network connection between the mobile device 108 and the network 104, or it is suitably downloaded from a data transmitting beacon. Use of a beacon for policy communication may be advantageous insofar as the policy may be implemented on the mobile device 108 before any network connection is ever established, thus enhancing security further. Device location is also suitably accomplished via geolocation that allows for determination of relative positioning of the mobile device 108 relative to network 104.

Figure 2:
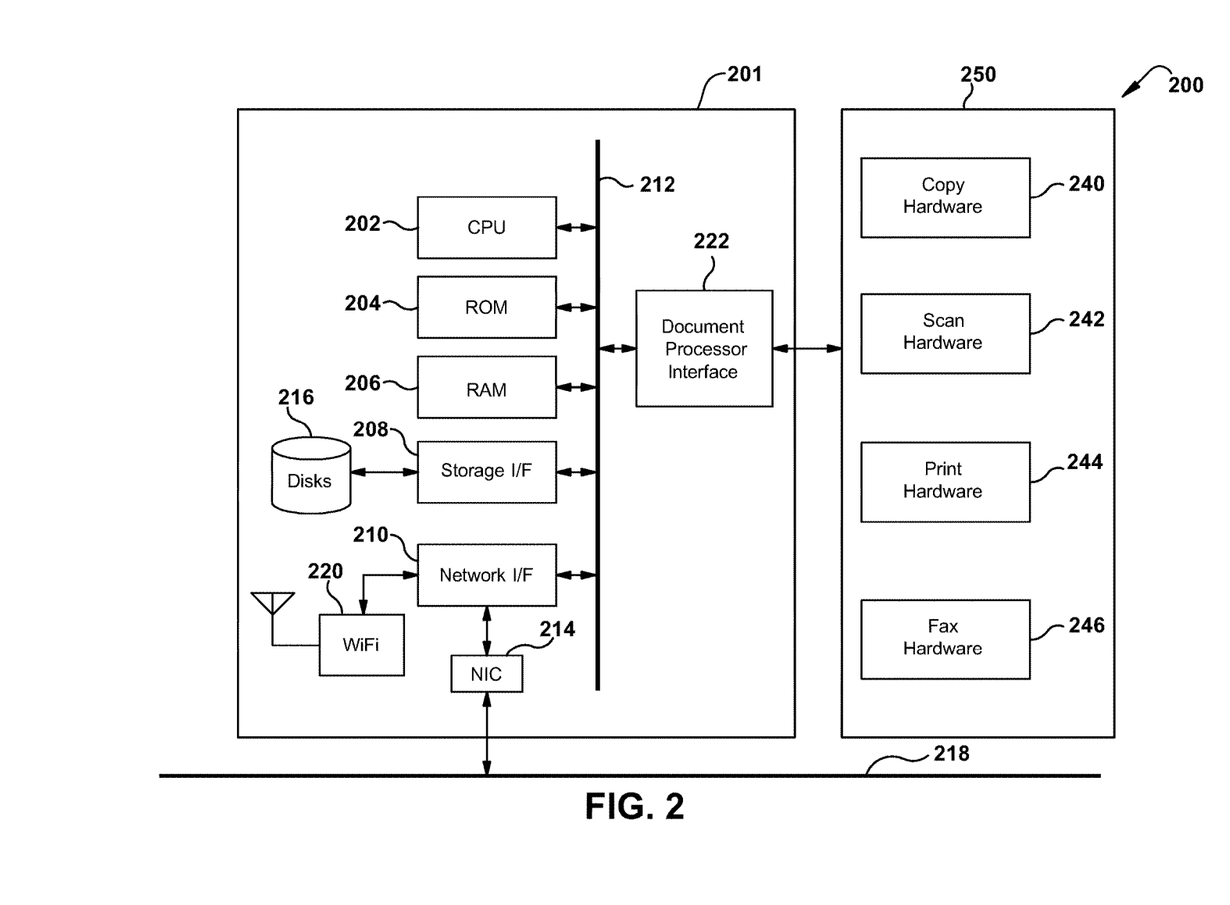
FIG. 2 is an example embodiment of a document rendering system.

Turning now to FIG. 2, illustrated is an example of a document rendering system 200 suitably comprised within an MFP as described herein. MFPs typically include various functionality including options such as paper selection, stapling, collating, color or black-and-white printing, faxing capability, e-mail capability, contact information, and the like. The example hardware embodiment detailed below suitably provides for any or all of these functions in accordance with an embedded controller 201. Policy data may selectively enable or disable any or all of the MFP capabilities. By way of further example, a visitor may be precluded from making color printouts, or may be constrained to a certain number of printed pages.

Included in controller 201 are one or more processors, such as that illustrated by processor 202. Each processor is suitably associated with non-volatile memory, such as ROM 204, and random access memory (RAM) 206, via a data bus 212.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 218, or to a wireless data connection via wireless network interface 220. Example wireless connections include cellular, Wi-Fi, Bluetooth, NFC, wireless universal serial bus (wireless USB), satellite, and the like. Example wired interfaces include Ethernet, USB, IEEE 1394 (FireWire), Lightning, telephone line, or the like. NIC 214 and wireless network interface 218 suitably provide for connection to an associated network (not shown).

Processor 202 can also be in data communication with any suitable user input/output (I/O) interface which provides data communication with user peripherals, such as displays, keyboards, mice, track balls, touch screens, or the like. Also in data communication with data bus 212 is a document processor interface 222 suitable for data communication with MFP functional units 250. In the illustrated example, these units include copy hardware 240, scan hardware 242, print hardware 244 and fax hardware 246 which together comprise MFP functional units 250. It will be understood that functional units are suitably comprised of intelligent units, including any suitable hardware or software platform.

Figure 3:
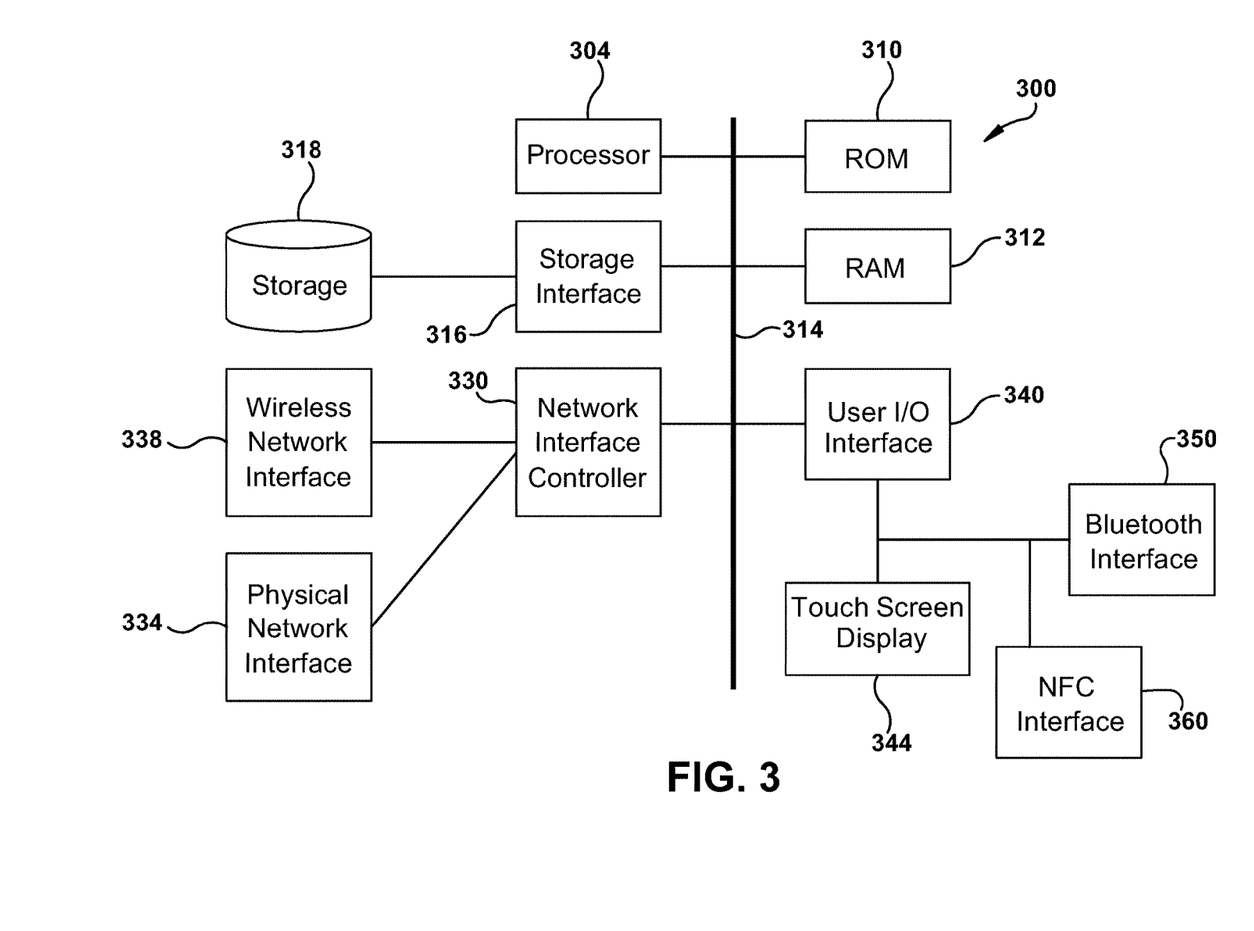
FIG. 3 is an example embodiment of a digital device system.

Turning now to FIG. 3, illustrated is an example embodiment of a digital device system 300 suitably comprising personal or portable data devices, such as user devices, as well as servers or network storage as detailed below. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 316 for reading or writing to a data storage system 318, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable wired or physical network connection via physical network interface 334, or to any suitable wireless data connection via wireless network interface 338. Example wireless connections include cellular, Wi-Fi, Bluetooth, NFC, wireless universal serial bus (wireless USB), satellite, and the like. Example wired interfaces include Ethernet, USB, IEEE 1394 (FireWire), telephone line, or the like.

Processor 304 is also in data communication with a user input/output (I/O) interface 340 which provides data communication with user peripherals, such as display 344, Bluetooth interface 350, or near-field communication interface 360, as well as keyboards, mice, track balls, touch screens, or the like. It will be understood that functional units are suitably comprised of intelligent units, including any suitable hardware or software platform.

Figure 4:
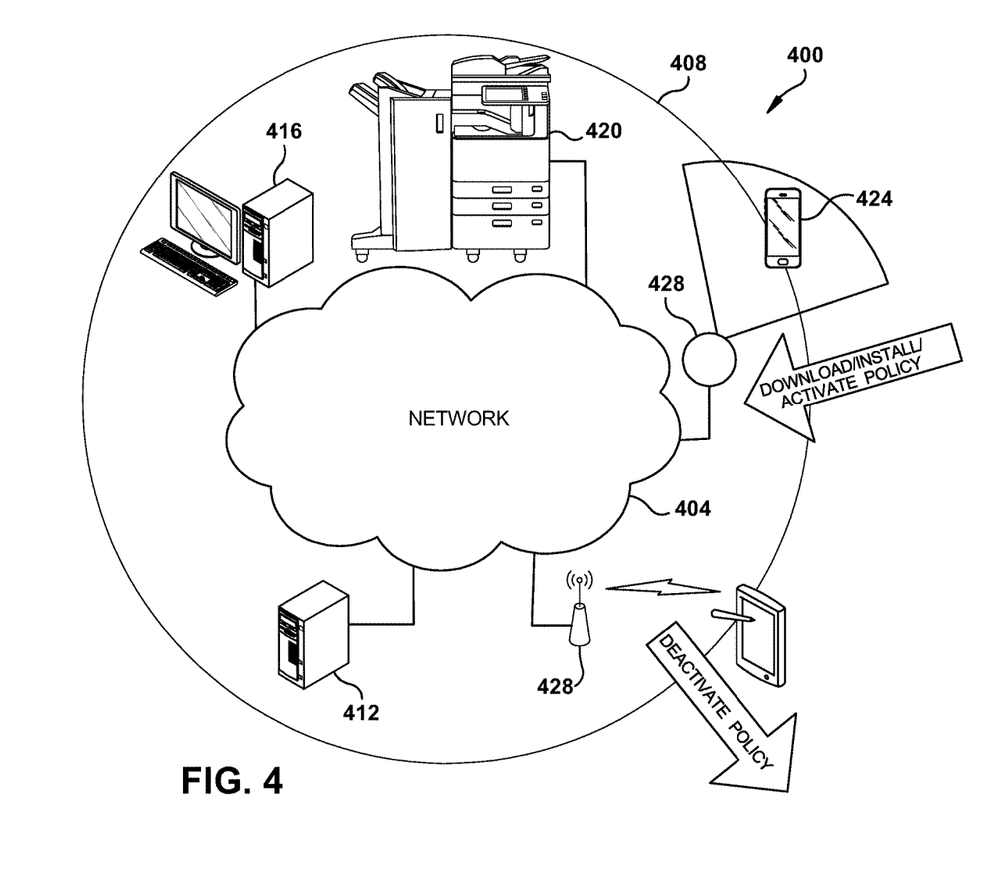
FIG. 4 is an example embodiment of a network policy system.

Turning now to FIG. 4, illustrated is an example embodiment of a network policy system 400. Access to network 404 is made subject to policy set by an administrator for devices that enter a perimeter 408. Policy is suitably managed by network server 412, suitably in accordance with selection received via administrator workstation 416. Network assets include one or more MFPs, such as MFP 420. Other assets suitably include network storage, Internet access, software downloads, data interchange capabilities or the like. In the illustrated example, smartphone 424 is brought within perimeter 408 and detection of the device or the network is made as described above. Beacon 428 suitably functions as a detection mechanism by sensing a signal from smartphone 424, or via detection of the beacon 428 by smartphone 424. Once the smartphone 424 is in perimeter 408, the user is suitably prompted to accept an associated policy, download, install, and activate it on their smartphone 424. Policy functions to selectively enable or disable network access, network device access or user device functionality as further describe herein. When the smartphone 424 exits the perimeter 408, the associated policy can be deactivated.

Figure 5:
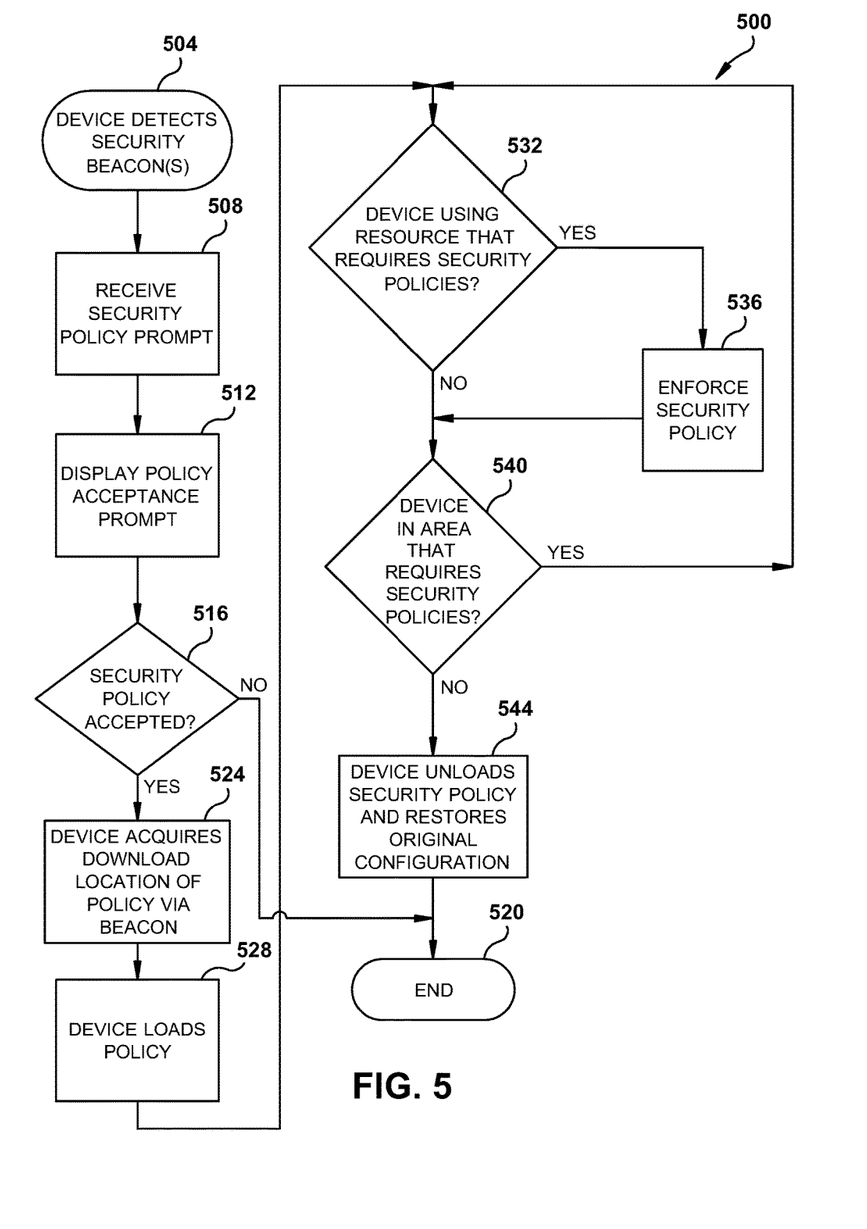
FIG. 5 is a flowchart of an example embodiment of operation of a user device.

FIG. 5 illustrates a flowchart 500 of an example embodiment of operation of a user device, such as a portable data device or smartphone as detailed above. The process commences at block 504 when the device detects a security beacon. Next, the device receives a security policy prompt at block 508. This prompt may be generated by a remote device, such as a beacon. Alternatively, an application running on the device may itself generate a prompt to the user once a beacon is identified. It will be appreciated that an administrator, in certain environments, such as environments having a high security clearance level, may choose to have a policy on the device implemented irrespective of user consent.

The prompt is displayed at block 512, and a user chooses whether to accept it at block 516. If acceptance is refused, the process suitably ends at block 520. If the security policy is accepted, the process progresses to block 524 wherein the policy is downloaded and the policy is loaded at block 528. Next, a determination is made as to whether resources are sought which require security policy intervention at block 532. If not, the process continues to block 540; if so, the policy is enforced at block 536 and the process continues to block 540. A determination is made at block 540 as to whether the device is still located in an area that requires a security policy. If it is, the process returns to block 532. If not, the policy is unloaded at block 544 and the process terminates at block 520.

Figure 6:
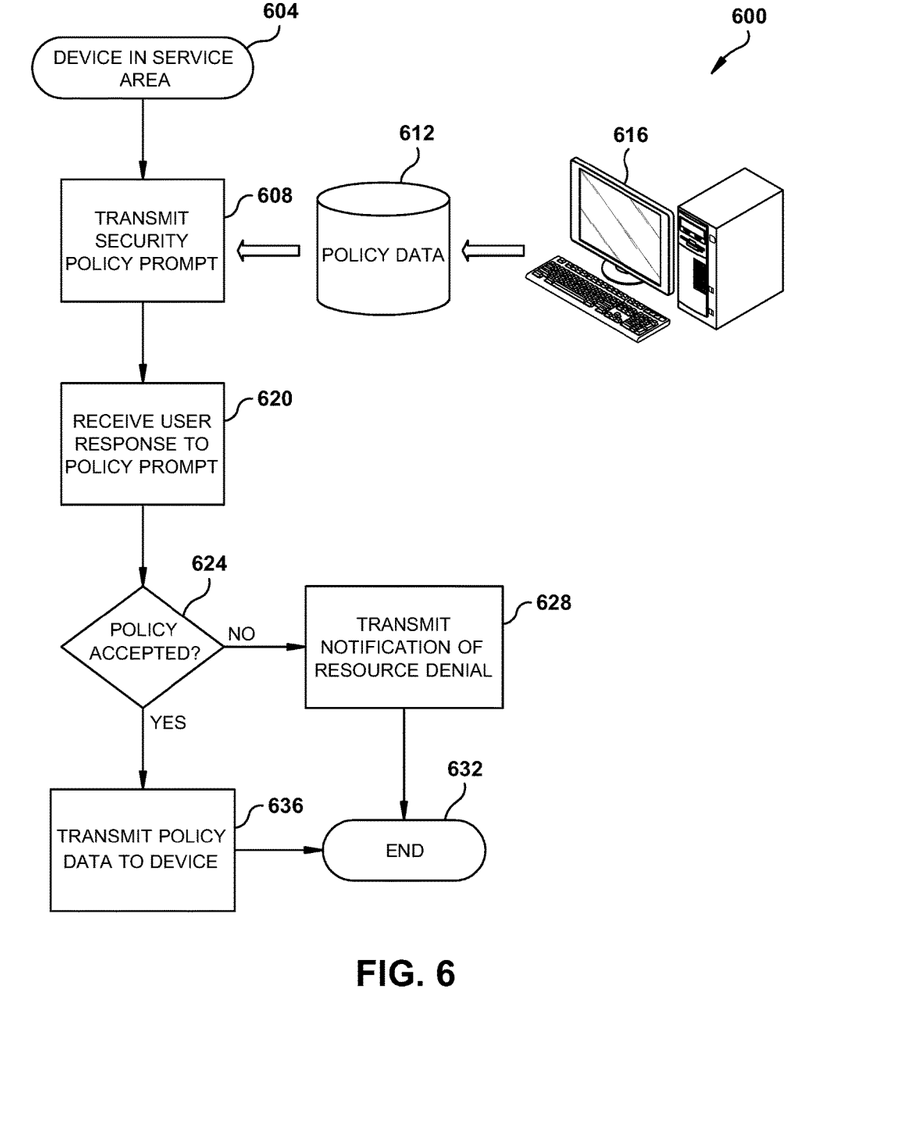
FIG. 6 is a flowchart of an example embodiment of implementing a security policy for portable data devices.

Referring next to FIG. 6, illustrated is a flowchart 600 of an example embodiment for implementing a security policy for portable data devices. This is suitably run on a server, or any other suitable digital processing device. The process commences at block 504 when the device enters a service area. A prompt to the user device relative to the security policy is transmitted to the user device at block 608. Policy data is retrieved from a data storage 612, suitably emanating from an administrative workstation 616. The user's response to the policy acceptance prompt is received at block 620 and a determination is made at block 624 as to whether it is accepted. If not, a message notifying the user of resource denial may be communicated to the user device at block 628 and the process ends at block 632. If the user accepts the policy, it is downloaded to the user at block 636 and the process ends at block 632. It an example embodiment where the policy is already resident on the user device, a trigger of that policy may be communicated at block 636 instead.

Figure 7:
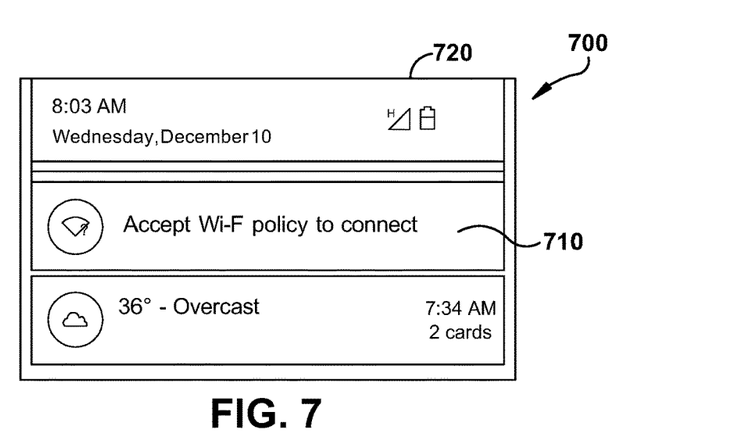
FIG. 7 is an example embodiment of a user policy acceptance prompt suitably on a user interface.
Figure 8:
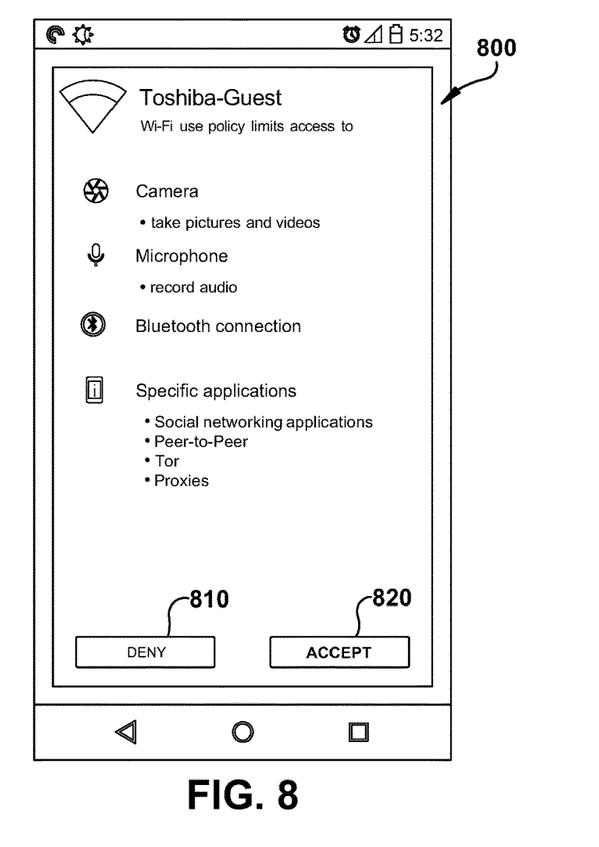
FIG. 8 is an example embodiment of a user policy on a user interface.

FIG. 7 illustrates an example embodiment of a user policy acceptance prompt 710 suitably displayed on a user interface 700 of an associated, portable data device 720. FIG. 8 illustrates an example embodiment of a user interface 800 wherein specific example functions addressed by the policy are denoted. In this example, the user may choose to deny 810 or accept 820 implementation of a policy on their device given the constraints that will be imposed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
   a beacon generator;
   a wireless beacon output configured to generate a wireless security beacon in accordance with an output of the beacon generator;
   a network interface;
   a wireless data interface configured to receive an access request from a portable data device responsive to the output of the beacon generator; and
   a processor and associated data storage,
      the data storage storing digital security policy data configured to enable a preselected set of functions on the portable data device,
      the processor configured to communicate the policy data to the portable data device in accordance with a received access request via the wireless data interface, and
      the processor further configured to establish a data communication channel between the network interface and the portable data device operable in conjunction with the policy data.

2. The system of claim 1 wherein the wireless data interface is further configured to receive identification data from the portable data device, and
   wherein the processor is further configured to select policy data in accordance with received identification data.

3. The system of claim 2 wherein the beacon generator is further configured to generate the security beacon inclusive of location data corresponding to a source for the policy data.

4. The system of claim 3 wherein the processor is further configured to data to generate an acceptance prompt on a user interface of the portable data device via the wireless data interface,
   wherein the wireless data interface is further configured to receive policy acceptance data responsive to the acceptance prompt from the portable data device, and
   wherein the processor is further configured to selectively communicate the policy data in accordance with received policy acceptance data.

5. The system of claim 1 wherein the beacon output is comprised of an acoustic generator.

6. The system of claim 1 wherein the beacon output is comprised of an RF generator.

7. The system of claim 1 wherein the network interface is comprised of a Wi-Fi adapter.

8. A method comprising:
generating a wireless security beacon;
receiving an access request from a portable data device responsive to the wireless security beacon via a wireless data interface;
communicating policy data configured to selectively enable a preselected set of functions to the portable data device in accordance with the received access request via the wireless data interface, and
enabling network access via a network interface with the portable data device operable in conjunction with the policy data.

9. The method of claim 8 further comprising:
selecting the access request including identification data from the portable data device via the wireless data interface; and
selecting policy data in accordance with received identification data.

10. The method of claim 8 wherein the wireless security beacon includes location data corresponding to a source for the policy data.

11. The method of claim 8 wherein the wireless security beacon includes an acoustic signal.

12. The method of claim 8 wherein the wireless security beacon is comprised of an RF signal.

13. The method of claim 8 wherein the network interface is comprised of a WiFi interface.

14. The method of claim 8 further comprising:
generating an acceptance prompt on a user interface of the portable data device via the wireless data interface;
receiving policy acceptance data responsive to the acceptance prompt from the portable data device via the wireless data interface; and
communicating the policy data in accordance with received policy acceptance data.

15. A portable data device comprising:
a processor and associated memory;
a network interface;
a user interface; and
a wireless data communication interface configured to receive broadcast data from an associated wireless network,
wherein the processor is configured to generate a policy acceptance prompt on a display of the user interface in accordance with received broadcast data,
wherein the processor is further configured to transmit acceptance data indicative of user policy acceptance received via the user interface responsive to the acceptance prompt via the wireless interface,
wherein the wireless data communication interface is further configured to receive policy data into the memory via the wireless interface,
wherein the processor is further configured to establish a data channel with a networked data device via the network interface while operable in conjunction with received policy data, and
wherein the processor is further configured to selectively enable a subset of portable data device functions in accordance with received policy data.

16. The device of claim 15 wherein the processor is further configured to generate the acceptance data including identification data identifying the portable data device.

17. The device of claim 15 wherein the network interface is comprised of a WiFi interface.

18. The device of claim 15 wherein the wireless data communication interface is comprised of an optical receiver.

19. The device claim 15 wherein the wireless data communication interface is comprised of an acoustic receiver.

20. The device of claim 15 wherein the wireless data communication interface is comprised of a near field communication interface.

* * * * *